Patented May 9, 1950

2,506,605

UNITED STATES PATENT OFFICE 2,506,605

1-ALKYL-4-HYDROXY-PIPERIDINE ESTERS OF ALKYL SUBSTITUTED ACETIC ACIDS

Henry Martin and Alfred Margot, Basel, Switzerland, assignors to J. R. Geigy, A. G., Basel, Switzerland, a Swiss firm No Drawing. Application August 24, 1944, Serial No. 551,073. In Switzerland August 9, 1943

Section 1, Public Law 690, August 8, 1946
Patent expires August 9, 1963

4 Claims. (Cl. 260—294)

It is known to esterify 4-hydroxypiperidines being substituted in 1-position with benzoic acid and with p-aminobenzoic acid, whereby compounds with local anesthetic effects are obtained (cf. Am. Soc. 51, 922 (1929)). In contradistinction thereto we have now found that esters obtainable from 1-substituted 4-hydroxypiperidines and acetic acids which are at least di-alkylsubstituted possess a surprising strong and manifest efficacy on the parasympathetic nervous system. Besides, the said compounds are distinguished by minimal toxicity which is lower than that of the esters obtainable from corresponding acids and basic alcohols of the diethanol amine type, although the pronounced neurotropic, atropine-like properties of the new compounds are by far increased. The basic esters claimed herein are water-soluble in form of their salts with inorganic or organic acids.

The preparation of the esters is carried out in the usual manner, for instance by causing reactive derivatives of at least di-alkylsubstituted acetic acids, i. e. their halides, esters or anhydrides, to react with 1-substituted 4-hydroxypiperidines in the presence or absence of condensation agents or by causing reactive esters of the said hydroxypiperidines to react, in some cases in the presence of acid binding agents, with the said acids or their salts respectively.

As reactive esters may be mentioned especially esters with hydrogen halide acids, with aryl sulfonic acids and the like.

As acetic acids, which are at least di-alkylsubstituted aliphatic, cycloaliphatic or araliphatic acids suitable for the esterification may be mentioned for example:—diethyl acetic acid, di-n-propyl acetic acid, di-n-butyl acetic acid, di-isobutyl acetic acid, isopropyl allyl acetic acid and so on, methyl-di-n-propyl acetic acid, methyl-n-butyl isobutyl acetic acid, dimethyl-n-butyl acetic acid, ethylidene-n-butyl acetic acid, dimethyl-n-butyloxy acetic acid, and so on. The di- and tri-alkyl acetic acids can be produced according to the method of Ziegler "Annalen" 1932, 495, 84 by alkylation of acetonitrile with alkyl halides and sodium amide, and hydrolysation of the nitriles obtained. As 1-substituted 4-hydroxypiperidines, there may be used:—1-methyl-, 1-ethyl-, 1-n- or iso-propyl-, 1-n- or iso-butyl and so on -4-hydroxypiperidines.

Example 1

8.1 parts of di-n-propyl acetic acid chloride are added while stirring to 6 parts of 1-methyl-4-hydroxypiperidine and the mixture is heated, while further stirring, to 160° C. for a short time, whereby with development of heat a clear, bright brown oil is produced, which, advantageously when still warm, is treated with water. The aqueous solution is extracted several times with ether and then the base is freed by means of concentrated ammonia. The base is now extracted with ether and, after having once washed and dried the ethereal solution, the solvent is distilled off. The residue has a boiling point of 139°–142° C. at 12 mm. pressure.

In an analogous manner the following esters can be obtained, when using the corresponding acid chlorides:

1-methyl-4-hydroxypiperidine ester of di-n-butyl acetic acid, B. P. $_{0.2\ mm.}$ 113°–114° C., 1-methyl-4-hydroxypiperidine ester of di-iso-butyl acetic acid, B. P. $_{0.07\ mm.}$ 98°–99° C., 1-methyl-4-hydroxypiperidine ester of n-proply-isobutyl acetic acid, B. P. $_{16\ mm.}$ 154°–157° C.

Example 2

9 parts of methyl-di-n-propyl acetic acid chloride are brought to reaction with 6 parts of 1-methyl-4-hydroxypiperidine and worked up in the same was as described in Example 1. Thus a colorless oil boiling at 142°–144° C. at 11 mm. pressure is obtained.

The same compound is also produced by interaction of salts of methyl-di-n-propyl acetic acid and 1-methyl-4-bromopiperidine.

In an analogous manner there may be obtained the ester of methyl-di-isobutyl acetic acid B. P. $_{11\ mm.}$ 161°–162° C.; the ester of methyl-n-propyl-n-butyl acetic acid B. P. $_{12\ mm.}$ 155°–157° C.; the ester of methyl-n-butyl-isobutyl acetic acid B. P. $_{12\ mm.}$ 160°–163° C.; and the ester of the α-cycloheptenyl-valeric acid, B. P. $_{0.08\ mm.}$ 140°–141° C.

Instead of the chlorides used in the above examples also other halides or the corresponding anhydrides or reactive esters may be used. Instead of the carboxylic acids and hydroxypiperidines used in the above examples also the other compounds enumerated in the introductory part of this specification can be used. Most of the cited carboxylic acids are known; where this is not the case, the same can be prepared according to the methods which are usual for the known acids.

What we claim is:

1. An 1-alkyl-4-hydroxy-piperidine ester corresponding to the formula

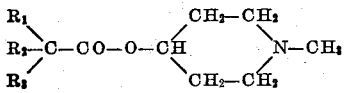

wherein $R_1$ represents a member selected from the group consisting of hydrogen and methyl, and $R_2$ and $R_3$ each represents a member selected from the group consisting of propyl and butyl.

2. The 1-methyl-4-hydroxypiperidine ester of methyl-di-n-propyl acetic acid of the formula

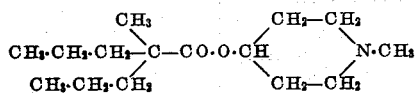

being a colorless oil of the boiling point of 142°–144° C. at 11 mm. pressure, possessing a strong action on the parasympathetic nervous system and a low toxicity.

3. The 1-methyl-4-hydroxy-piperidine ester of di-isobutyl acetic acid, corresponding to the formula

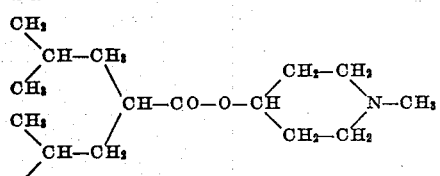

being a colorless oil of the boiling point of 98–99° C. at 0.07 mm. pressure, possessing a strong action on the parasympathetic nervous system and a low toxicity.

4. The 1-methyl-4-hydroxypiperidine ester of methyl-n-propyl-n-butyl acetic acid of the formula

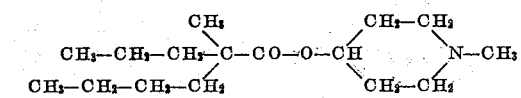

being a colorless oil of the boiling point of 155°–157° C. at 12 mm. pressure, possessing a strong action on the parasympathetic nervous system and a low toxicity.

HENRY MARTIN.
ALFRED MARGOT.

REFERENCES CITED

The following references are of record in the file of this patent:

UNITED STATES PATENTS

| Number | Name | Date |
|---|---|---|
| 2,370,114 | Klemme et al. | Feb. 20, 1945 |
| 2,417,208 | Martin et al. | Mar. 11, 1947 |
| 2,429,835 | Martin et al. | Oct. 28, 1947 |

FOREIGN PATENTS

| Number | Country | Date |
|---|---|---|
| 483,258 | Great Britain | Apr. 14, 1938 |

OTHER REFERENCES

Meenwein, Chem. Abstracts, vol. 14 (1920), page 1310.

Burtner et al., Jour. Am. Chem. Soc., vol. 65, pages 262–267 (Feb. 1943).